(12) United States Patent
Makwana et al.

(10) Patent No.: US 8,355,294 B2
(45) Date of Patent: Jan. 15, 2013

(54) SYNCHRONOUS DATA PROCESSING SYSTEM FOR RELIABLE TRANSFER OF DATA IRRESPECTIVE OF PROPAGATION DELAYS AND PROCESS, VOLTAGE AND TEMPERATURE (PVT) VARIATIONS

(75) Inventors: Prakash Makwana, Noida (IN); Prabhjot Singh, Noida (IN)

(73) Assignee: Freescale Semiconductor, Inc, Austin, TX (US)

( * ) Notice: Subject to any disclaimer, the term of this patent is extended or adjusted under 35 U.S.C. 154(b) by 159 days.

(21) Appl. No.: 13/050,932

(22) Filed: Mar. 18, 2011

(65) Prior Publication Data

US 2012/0239961 A1   Sep. 20, 2012

(51) Int. Cl.
    *G11C 8/18* (2006.01)
(52) U.S. Cl. ......... 365/233.19; 365/233.12; 365/233.1; 365/189.17; 365/189.05; 365/194; 365/195; 365/221; 713/401; 713/503
(58) Field of Classification Search .......... 365/233.12, 365/233.16, 233.17, 233.19, 233.1, 189.17, 365/189.05, 194, 195, 191, 221; 713/401, 713/400, 503, 500
See application file for complete search history.

(56) References Cited

U.S. PATENT DOCUMENTS

| | | | |
|---|---|---|---|
| 6,003,118 A | 12/1999 | Chen | |
| 6,509,762 B1 * | 1/2003 | Moss et al. | 327/12 |
| 7,038,972 B2 * | 5/2006 | Seo et al. | 365/189.15 |
| 7,436,919 B2 | 10/2008 | Rahman | |
| 7,464,284 B2 | 12/2008 | Arnold | |
| 7,590,008 B1 | 9/2009 | Roge | |
| 7,671,579 B1 | 3/2010 | Chong et al. | |
| 7,685,454 B2 | 3/2010 | Cornelius | |
| 7,711,940 B2 | 5/2010 | Wada | |
| 7,719,904 B2 | 5/2010 | Lee | |
| 7,721,137 B2 | 5/2010 | Lin | |
| 7,778,095 B2 | 8/2010 | Na | |
| 7,805,627 B2 | 9/2010 | Rashid | |
| 7,809,085 B2 | 10/2010 | Rea | |
| 7,852,706 B2 | 12/2010 | Bae | |
| 7,872,508 B2 * | 1/2011 | Ku et al. | 327/158 |
| 2008/0294927 A1 | 11/2008 | Kuzmin | |

* cited by examiner

*Primary Examiner* — Andrew Q Tran
(74) *Attorney, Agent, or Firm* — Charles Bergore

(57) ABSTRACT

A synchronous data processing system includes a memory module to store data and a memory controller coupled to the memory module. The memory controller includes a clock inverter to receive an input clock signal and to transmit an inverted clock signal to the memory module. The inverted clock signal incurs a first propagation delay prior to reaching the memory module as a memory clock signal. A write data buffer is coupled to the memory module. The write data buffer transmits data to the memory module in response to the input clock signal. An asynchronous first-in-first-out (ASYNC FIFO) buffer is coupled to the memory module. The ASYNC FIFO buffer reads data from the memory module in response to a feedback signal generated by feeding back the memory clock signal to the ASYNC FIFO buffer.

20 Claims, 7 Drawing Sheets

SYNCHRONOUS DATA PROCESSING SYSTEM FOR RELIABLE TRANSFER OF DATA IRRESPECTIVE OF PROPAGATION DELAYS AND PROCESS, VOLTAGE AND TEMPERATURE (PVT) VARIATIONS

BACKGROUND OF THE INVENTION

The present invention relates generally to data processing systems, and more particularly to reliable data transfer in synchronous data processing systems.

As the operating speed of data processing systems such as microcomputers has increased in recent years, operating speeds of peripheral devices such as microprocessors and memory devices such as synchronous dynamic random access memory (SDRAM) have also increased to improve performance of such systems. There also has been an increase in the operating frequency of the busses connecting processors and peripherals. However, as the frequency increases, propagation delay and PVT variations play a more significant role in data transfer.

Typically, in synchronous data processing systems, there is a phase difference or skew between the clock and data signals transferred between the components such as a memory controller and a memory device. Such phase skew is incurred due to propagation delay and process, voltage and temperature (PVT) variations. As frequency increases, phase skew may increase, which can lead to incorrect data sampling during read or write operations.

One way of reducing the phase skew is by employing a phase lock loop (PLL) circuit for improving the data sampling. FIG. 1 is a block diagram of a conventional data processing system 10 having a PLL circuit 12. The data processing system 10 includes a memory controller 14 and a memory module 16. The memory controller 14 includes the PLL circuit 12 for compensating for any phase skew between clock and data signals transferred between the memory controller 14 and the memory module 16.

In operation, the memory controller 14 receives an input clock signal (IP_CLK) 18 from a clock signal generator (not shown) that is fed to read and write data buffers 20 and 22. The memory controller 14 also generates a memory clock signal 23 for the memory module 16. Here, data signals (IP_DATA and MEM_DATA) transmitted between the memory controller 14 and the memory module 16 are represented generally by reference numerals 24 and 26.

As illustrated, the memory clock signal (MEM_CLK) 23 is looped back half way between the memory controller 14 and the memory module 16 and a clock in signal (CLK_IN) 28 is fed to the PLL circuit 12 to generate a clock out signal (CLK_OUT) 30. This feedback mechanism improves data sampling. Thus, the clock signals observed by the memory controller 14 and the memory module 16 are aligned, thereby providing one complete cycle for data transfer during read and write operations. Although the PLL circuit 12 with the looped back signal CLK_IN 28 improves the data sampling of the system, it has a limitation in that it works only if the propagation delay between memory controller 14 and memory module 16 is less than one clock cycle.

FIG. 2 is a timing diagram of the data read and write cycles for the data processing system 10 of FIG. 1. In the illustrated embodiment, the memory clock signal and the looped back signal cycles are represented by reference numerals 50 and 52. The memory clock signals and the looped back signals 50 and 52 are phase aligned. Further, data signals launched by the memory controller 14 and received by the memory module 16 during a write operation are represented by reference numerals 54 and 56. Similarly, data signals transmitted by the memory module 16 and read by the memory controller 14 are represented by reference numerals 58 and 60 respectively.

In a write cycle, data (IP_DATA) 54 is launched from the write data buffer 22 at a positive edge of the clock signal 52 (IP_CLK which is phase aligned to CLK_IN) and is received by the memory module 16 as MEM_DATA 56. In a read cycle, MEM_DATA 58 is launched from the memory module 72 at a positive edge of the memory clock signal (MEM_CLK) 50 and is read by the memory controller 14 as IP_DATA 60.

As can be seen, the PLL circuit 12 fails to compensate for the phase skew during write and read cycles when the propagation delay is around one clock cycle or more, as indicated by reference numerals 62 and 64. Unfortunately, this may lead to incorrect data sampling.

In addition, the PLL circuits occupy significant area on the circuit board and are typically designed for a pre-determined frequency band, and characterization of such PLL circuits is tedious and, as mentioned above, susceptible to varying PVT conditions.

Therefore a need exists for a data processing system that allows for reliable data transfer given varying propagation delay and PVT conditions.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale. For example, the thicknesses of layers and regions may be exaggerated for clarity.

DETAILED DESCRIPTION OF THE INVENTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components.

It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In one embodiment, the present invention provides a synchronous data processing system. The synchronous data processing system includes a memory module to store data and a memory controller coupled to the memory module. The memory controller includes a clock inverter to receive an input clock signal and to transmit an inverted clock signal to the memory module. The inverted clock signal incurs a first propagation delay prior to reaching the memory module as a memory clock signal. A write data buffer is coupled to the memory module. The write data buffer transmits data to the memory module in response to the input clock signal. An asynchronous first-in-first-out (ASYNC FIFO) buffer is coupled to the memory module. The ASYNC FIFO buffer reads data from the memory module in response to a feedback signal generated by feeding back the memory clock signal to the ASYNC FIFO buffer.

In another embodiment, the present invention provides a method for transferring data between a memory module and a memory controller in a synchronous data processing system. The method includes receiving an input clock signal and transmitting an inverted input clock signal to the memory module to generate a memory clock signal for the memory module. The memory clock signal is fed back from the memory module to the memory controller such that the clock signals transferred between the memory controller and the memory module incur substantially the same phase delay as that of data transmitted between the memory module and the memory controller.

Figure 1:
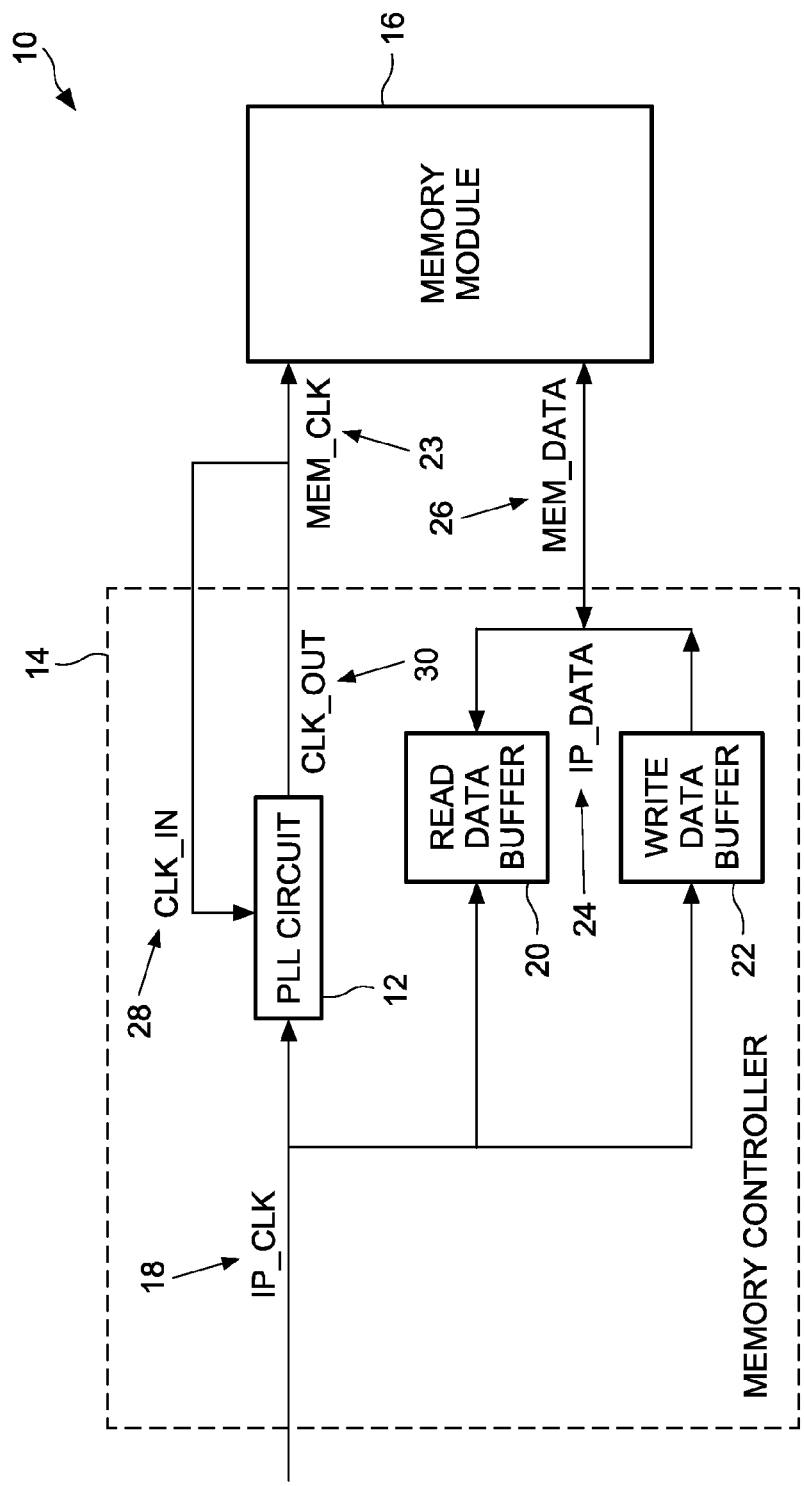
FIG. 1 is a block diagram of a conventional data processing system having a PLL circuit.
Figure 2:
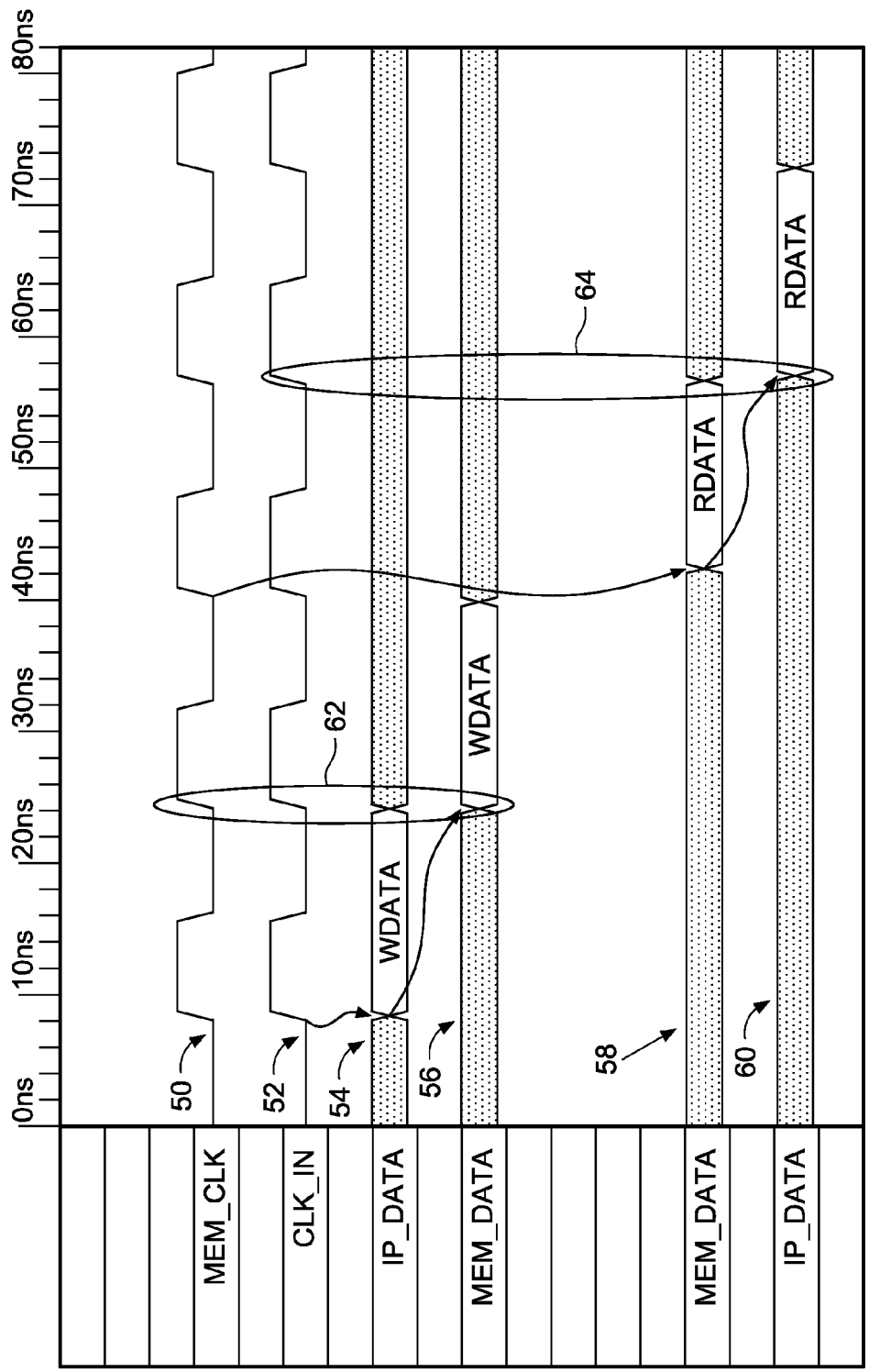
FIG. 2 illustrates exemplary timing diagrams for data read and write cycles for the data processing system of FIG. 1.
Figure 3:
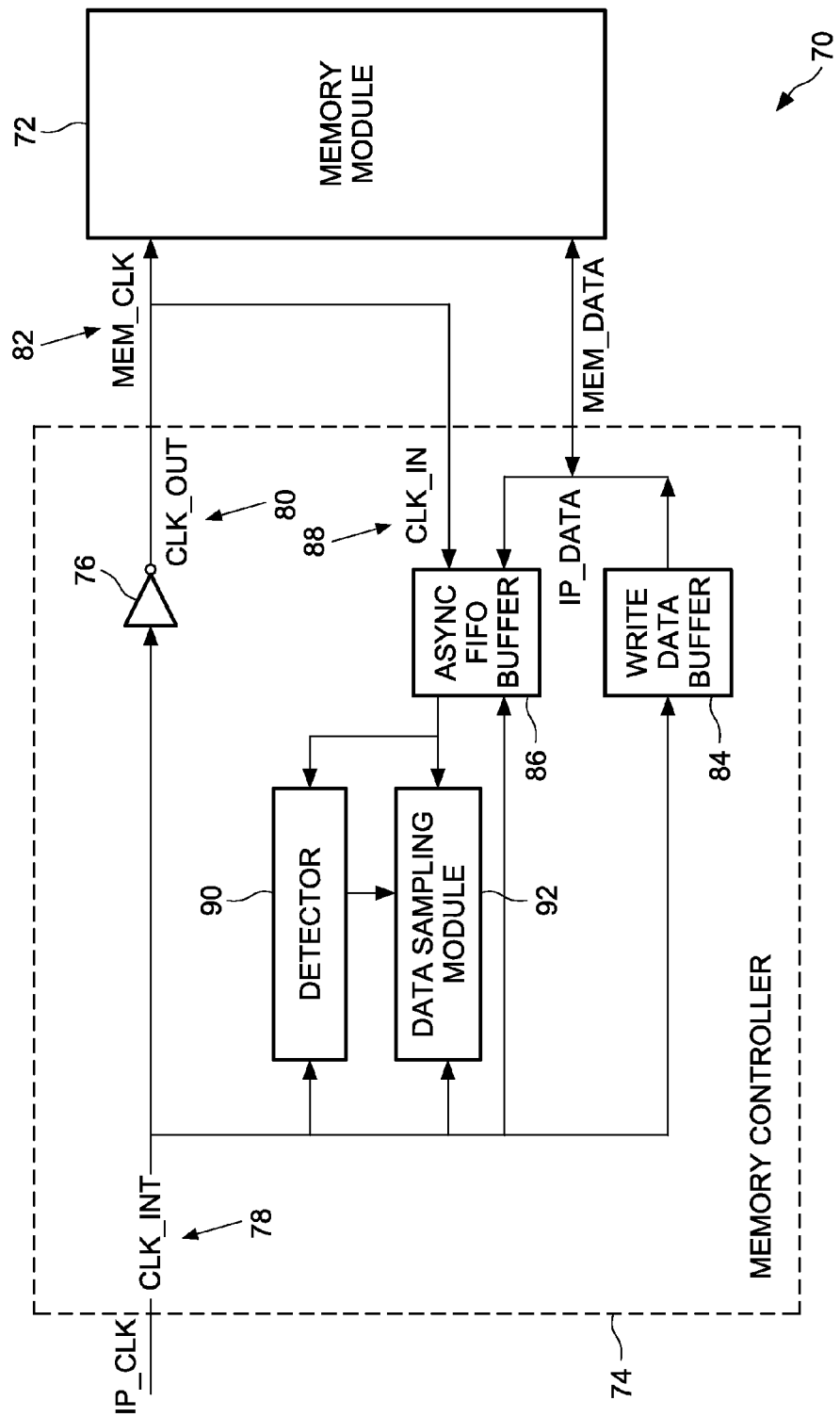
FIG. 3 illustrates an exemplary configuration of a synchronous data processing system in accordance with one embodiment of the present invention.

Referring now to FIG. 3, an exemplary configuration 70 of a synchronous data processing system is illustrated. The synchronous data processing system 70 includes a memory module 72 to store data. A memory controller 74 is coupled to the memory module 72. In the illustrated embodiment, the memory controller 74 includes a clock inverter 76 to receive an input clock signal (CLK_INT) 78 and to transmit an inverted clock signal (CLK_OUT) 80 to the memory module 72. The memory controller 74 may receive the input clock signal (CLK_INT) 78 from a clock generator (not shown).

The inverted clock signal (CLK_OUT) 80 incurs a first propagation delay prior to reaching the memory module as a memory clock signal (MEM_CLK) 82. In this exemplary embodiment, the inverted clock signal (CLK_OUT) 80 is to increase a setup and a hold time for data sampling. In one exemplary embodiment, the inverted clock 76 provides about half clock cycle as the setup and hold times for the memory module 72 thus providing better data sampling window during write operation.

The memory controller 74 includes a write data buffer 84 coupled to the memory module 72. The write data buffer 84 transmits data to the memory module 72 in response to the input clock signal (CLK_INT) 78. Moreover, an asynchronous first-in-first-out (ASYNC FIFO) buffer 86 is coupled to the memory module 72. The ASYNC FIFO buffer 86 reads data from the memory module 72 in response to a feedback clock signal (CLK_IN) 88 generated by feeding back the memory clock signal (MEM_CLK) 82 to the ASYNC FIFO buffer 86. In this exemplary embodiment, the memory clock signal (MEM_CLK) 82 is routed to the ASYNC FIFO buffer 86 when it is substantially near to the memory module 72.

During a write operation, data (IPDATA) is launched from the write data buffer 84 of the memory controller 74 on a positive edge of the input clock signal (CLK_INT) 78. The data propagates with a delay and is received by the memory module 72 as MEM_DATA. As will be appreciated by one skilled in the art the propagation delay of data transmitted from the write data buffer 84 to the memory module 72 is substantially the same as the first propagation delay, as the clock and data signals travel the same distance to the memory module 72. Advantageously, this facilitates accurate write data sampling.

Similarly, during a read operation, data (MEM_DATA) is launched from the memory module 72 corresponding to a positive edge of the memory clock signal (MEM_CLK) 82. The data propagates with a delay and is received by the ASYNC FIFO buffer 86 of the memory controller 74 as IP_DATA. Again, the propagation delay of data received by the ASYNC FIFO buffer 86 from the memory module 72 is substantially the same as a second propagation delay incurred by the memory signal (MEM_CLK) 82 prior to reaching the ASYNC FIFO buffer 86. It should be noted that the clock and data incur the same delay as the clock is looped back from the memory module 72 to the ASYNC FIFO buffer 86.

The synchronous data processing system 70 also includes a detector 90 coupled to the ASYNC FIFO buffer 86. In the illustrated embodiment, data is transferred in form of packets, each packet having a start and end of frame such as in secure digital (SD) protocol. The detector 90 detects start of a frame in the incoming packet data from the memory module 72.

A data sampling module 92 is coupled to the detector 90 and the ASYNC FIFO buffer 86 for triggering data sampling from the ASYNC FIFO buffer 86 in response to the feedback clock signal (CLK_IN) 88. Once data sampling is triggered, the ASYNC FIFO buffer 86 provides data to the data sampling module 92 in response to the input clock signal (CLK_INT) 78. The operation of the detector 90 and the data sampling module 92 for sampling of packetized data is described below with reference to FIG. 6.

Figure 4:
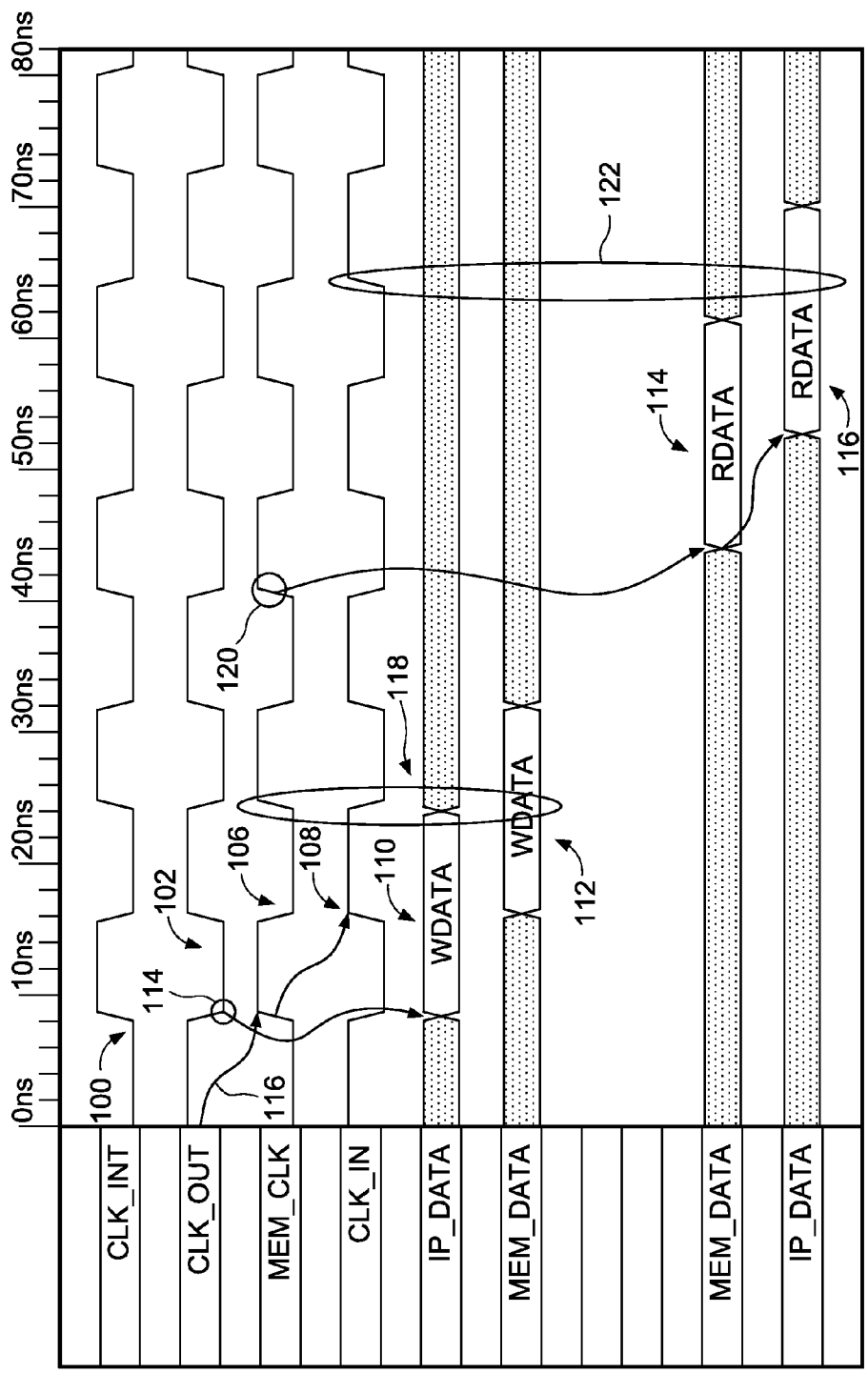
FIG. 4 illustrates exemplary timing diagrams for data read and write cycles for the synchronous data processing system of FIG. 3.

FIG. 4 illustrates exemplary timing diagrams for data read and write cycles for the synchronous data processing system 70 of FIG. 3. In the illustrated embodiment, the input clock signal (CLK_INT) received by the memory controller 74 is represented by reference numeral 100. Further, the inverted clock signal (CLK_OUT) transmitted by the clock inverter 76 is represented by reference numeral 102. Moreover the memory clock signal (MEM_CLK) and feedback signal (CLK_IN) cycles are represented by reference numerals 106 and 108 respectively.

Further, data signals launched by the memory controller 74 and received by the memory module 72 during a write operation are represented by reference numerals 110 and 112 respectively. Similarly, data signals transmitted by memory module 72 and read by the memory controller 74 during the read operation are represented by reference numerals 114 and 116 respectively.

As illustrated, data (IP_DATA) 110 is launched from the write data buffer 84 corresponding to the positive edge of input clock signal (CLK_INT) 100 that is the negative edge (represented by reference numeral 114) of the inverted clock signal (CLK_OUT) cycle 102. In the illustrated embodiment, the inverted clock signal (CLK_OUT) 102 incurs a propagation delay of about one-half clock cycle, for example, prior to reaching the memory module 72 as the memory clock signal (MEM_CLK) 104, as represented by reference numeral 116. The data also incurs the same propagation delay one-half clock cycle prior to reaching the memory module 72, as represented by reference numeral 118.

During the read operation, (MEM_DATA) 114 is launched from the memory module 72 corresponding to a positive edge 120 of the memory clock signal (MEM_CLK) 106. The data propagates with a delay and is received by the ASYNC FIFO buffer 86 of the memory controller 74 as IP_DATA 116. Again, in this example, the propagation delay of data received by the ASYNC FIFO buffer 86 from the memory module 72 is about one-half clock cycle, which is same as the propagation delay incurred by the memory signal (MEM_CLK) 82 prior to reaching the ASYNC FIFO buffer 86, as represented by reference numeral 122.

Figure 5:
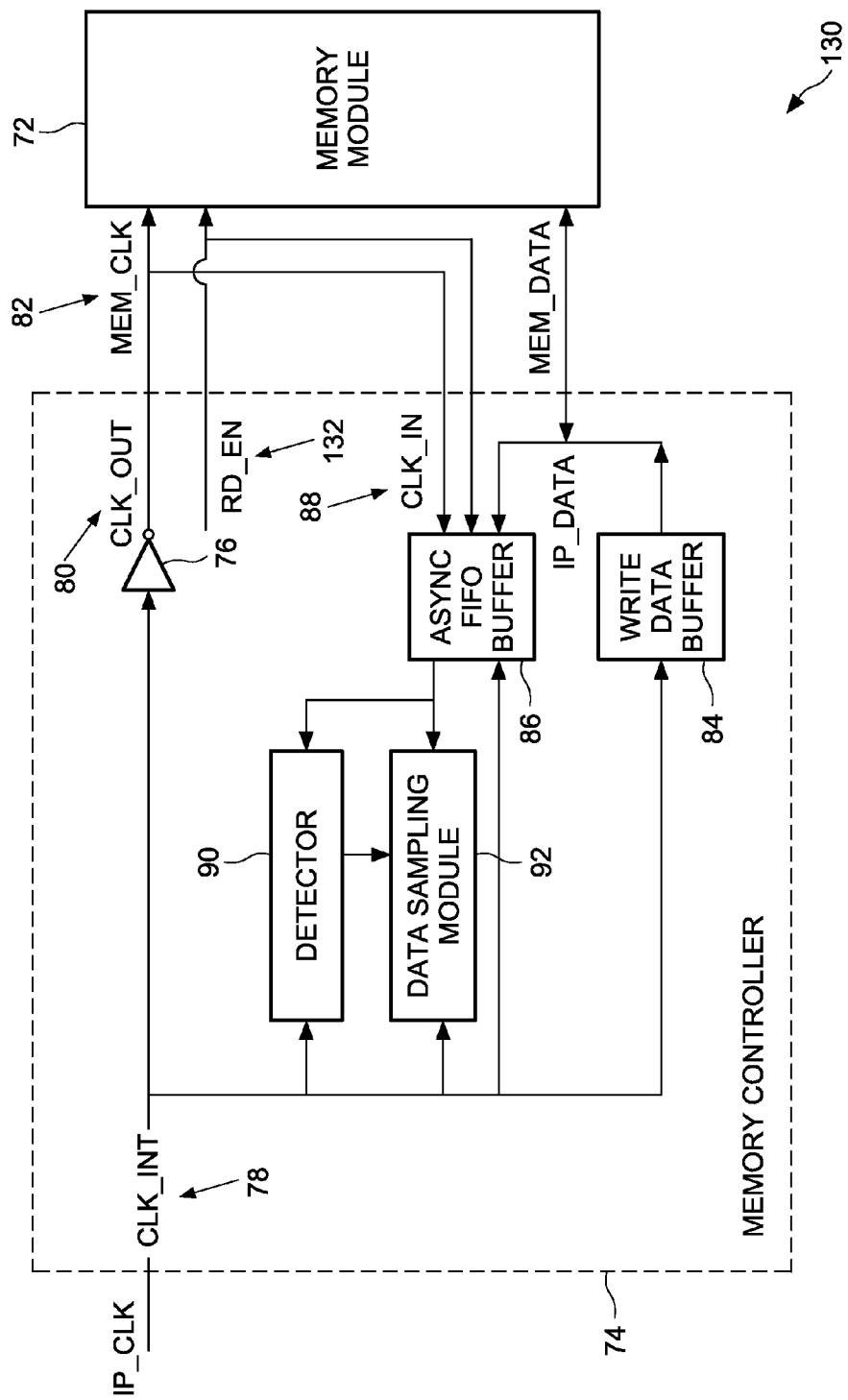
FIG. 5 illustrates another exemplary configuration of the synchronous data processing system of FIG. 3.

FIG. 5 illustrates another exemplary configuration of a synchronous data processing system 130. In this exemplary embodiment, the data transferred between the memory controller 74 and the memory module 72 includes a validating signal such as read enable or write enable signals typically used in static random-access memory (SRAM). The detector 90 detects the validating signal like a read enable (RD_EN) signal 132 of data received from the memory module 72.

The detector 90 triggers the data sampling module 92 to sample the data from the ASYNC FIFO buffer 86 in response to the feedback clock signal 88 and the validating signal 132 fed back into the ASYNC FIFO buffer 86 from the memory module 72. The operation of the detector 90 and the data sampling module 92 for this configuration is described with reference to FIG. 7.

Figure 6:
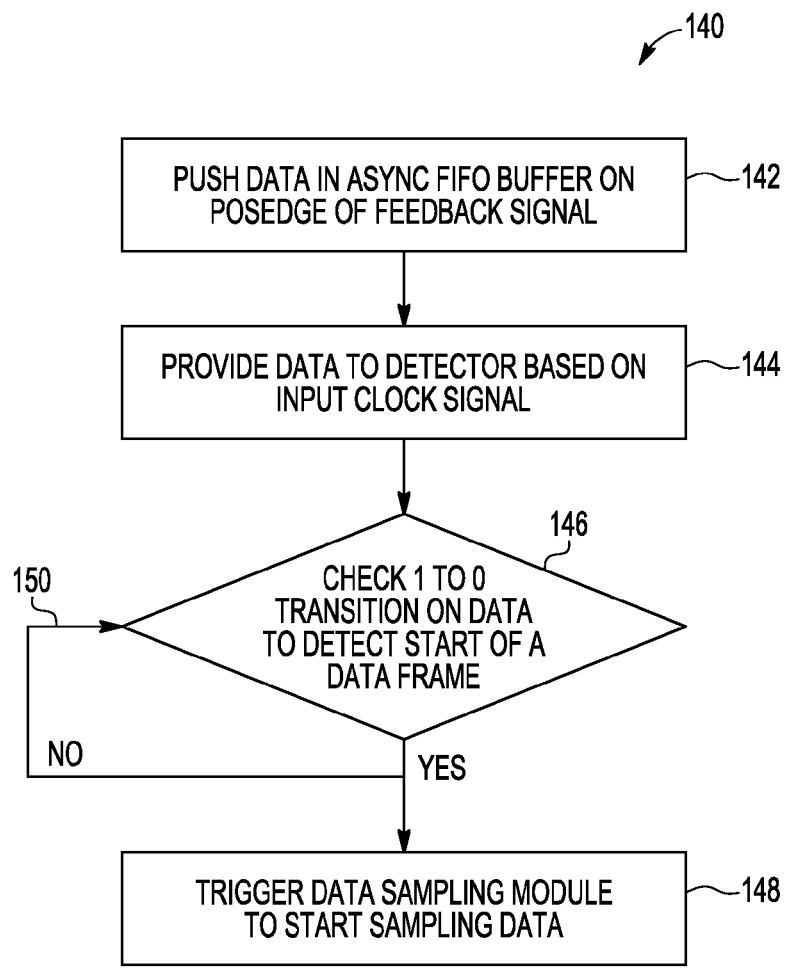
FIG. 6 is a flowchart illustrating a method of sampling packetized data using the synchronous data processing system of FIG. 3 in accordance with the present invention.

FIG. 6 is a flowchart illustrating a method 140 of sampling packetized data using the synchronous data processing system 70 of FIG. 3 in accordance with the present invention. At block 142, data is pushed into the ASYNC FIFO buffer on a positive edge (posedge) of the feedback clock signal 88. Further, data from the ASYNC FIFO buffer is provided to the detector in response to the input clock signal (block 144). In this exemplary embodiment, data is transferred to the detector whenever the ASYNC FIFO buffer is not empty.

At block 146, the detector detects start of a frame of the incoming packetized data by checking 1 to 0 transition of the data. If the start of the frame is detected, the data sampling module is triggered to sample data from the ASYNC FIFO, as represented by block 148. Alternately, the detector looks for the next start of frame, as represented by block numeral 150.

Figure 7:
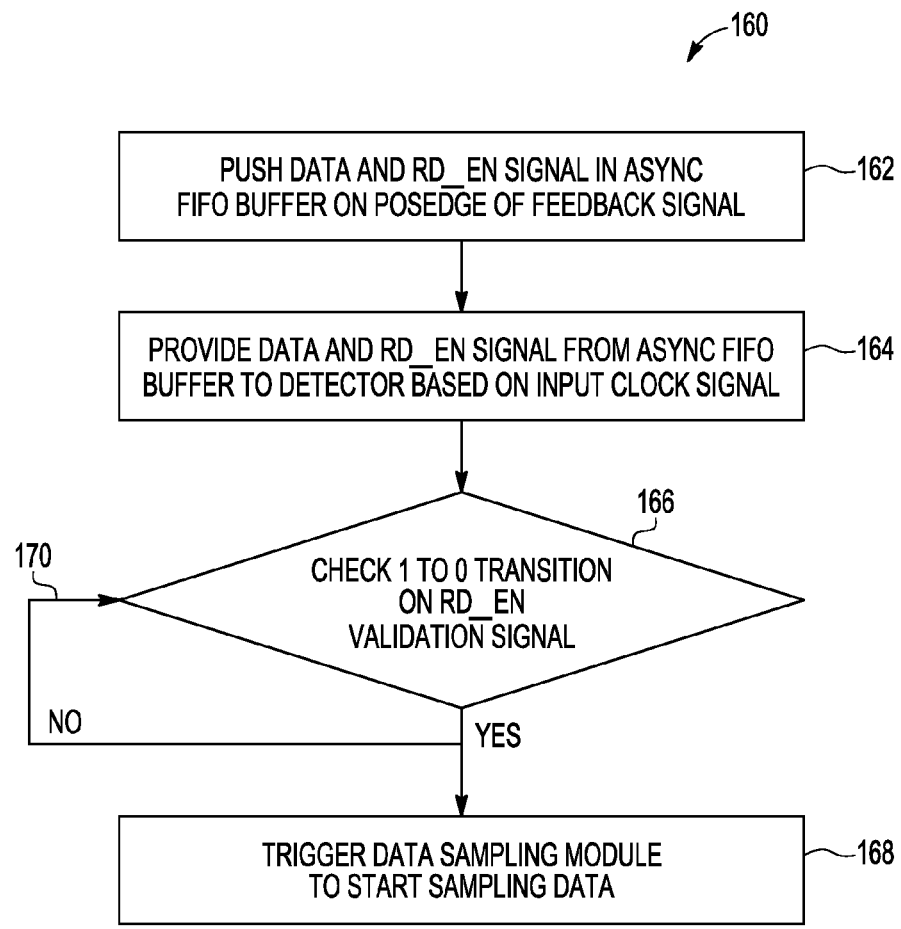
FIG. 7 is a flowchart illustrating a method of sampling data with a validating signal using the synchronous data processing system of FIG. 5 in accordance with the present invention.

FIG. 7 is a flowchart illustrating a method 160 of sampling data with a validating signal using the synchronous data processing system 130 of FIG. 5 in accordance with the present invention. At block 162, data and a validating signal such as a read enable (RD_EN) signal is pushed into the ASYNC FIFO buffer on a positive edge (posedge) of a feedback signal from the memory module. Further, data and the read enable validating signal from the ASYNC FIFO buffer are provided to the detector in response to the input clock signal (block 164). In this exemplary embodiment, data and the read enable validating signal are transferred to the detector whenever the ASYNC FIFO buffer is not empty.

At block 166, the detector detects 1 to 0 transition on the read enable validating signal. If the read enable validating signal is detected, the data sampling module is triggered to sample data from the ASYNC FIFO, as represented by block 168. In certain embodiments, the data sampling is initiated after a memory access time. Alternately, the detector looks for next read enable validating signal, as represented by block numeral 170.

The present invention, as described above, allows for reliable transfer of data irrespective of propagation delays and PVT conditions. As described above, a definite relationship is established between clock and data signals transferred between a memory controller and a memory module of the data transfer system that compensates for phase skew incurred by propagation delays and PVT conditions.

The technique employs an inverted clock for feeding an inverted clock signal to memory module for write data sampling and includes a clock signal distribution module that routes the memory clock signal from the memory module to generate a feedback signal and employs it with an ASYNC FIFO buffer for read data sampling. The inverted clock utilized in the system also improves setup and hold times during write operations.

By now it should be appreciated that there has been provided an improved synchronous data processing system and a method of transferring data in a synchronous data processing system. Any circuit details not disclosed is because knowledge thereof is not required for a complete understanding of the invention.

Unless stated otherwise, terms such as "first" and "second" are used to arbitrarily distinguish between the elements such terms describe. Thus, these terms are not necessarily intended to indicate temporal or other prioritization of such elements. Further, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The invention claimed is:

1. A synchronous data processing system, comprising:
a memory module for storing data;
a memory controller coupled to the memory module, wherein the memory controller includes,
   a clock inverter that receives an input clock signal and provides an inverted clock signal to the memory module, wherein the inverted clock signal incurs a first propagation delay prior to reaching the memory module as a memory clock signal;
   a write data buffer coupled to the memory module, wherein the write data buffer provides data to the memory module in response to the input clock signal; and
   an asynchronous first-in-first-out (ASYNC FIFO) buffer coupled to the memory module, wherein the ASYNC FIFO buffer reads data from the memory module in response to a feedback signal generated by feeding back the memory clock signal to the ASYNC FIFO buffer.

2. The synchronous data processing system of claim 1, wherein a propagation delay of data transmitted from the write data buffer to the memory module is substantially the same as the first propagation delay.

3. The synchronous data processing system of claim 1, wherein the memory clock signal incurs a second propagation delay prior to reaching the ASYNC FIFO buffer, the second propagation delay being substantially the same as a propagation delay of data received by the ASYNC FIFO buffer from the memory module.

4. The synchronous data processing system of claim 1, further comprising:
   a detector, coupled to the ASYNC FIFO buffer, that detects incoming packet data from the memory module; and
   a data sampling module, coupled to the detector and the ASYNC FIFO buffer, for triggering the data sampling module to sample data from the ASYNC FIFO buffer in response to the feedback signal.

5. The synchronous data processing system of claim 4, wherein the ASYNC FIFO buffer provides data to the data sampling module in response to the input clock signal.

6. The synchronous data processing system of claim 4, wherein the detector detects a validating signal of data received from the memory module.

7. The synchronous data processing system of claim 6, wherein the validating signal comprises a read enable signal.

8. The synchronous data processing system of claim 6, wherein the detector triggers the data sampling module to sample the data from the ASYNC FIFO buffer in response to the feedback signal and the validating signal fed back from the memory module.

9. The synchronous data processing system of claim 1, wherein the inverted clock signal is to increase a setup time and a hold time for data sampling.

10. The synchronous data processing system of claim 1, wherein the memory controller receives the input clock signal from a clock generator.

11. A memory controller for use with a memory module of a synchronous data processing system, the memory controller comprising:
    a clock inverter for receiving an input clock signal and transmitting an inverted clock signal to the memory module, wherein the inverted clock signal incurs a first propagation delay prior to reaching the memory module as a memory clock signal;
    a clock signal distribution module that generates a feedback signal by routing the memory clock signal from the memory module to the memory controller such that the clock signals transferred between the memory controller and the memory module have substantially the same phase delay as that of data transmitted between the memory module and the memory controller.

12. The memory controller of claim 11, wherein the phase delay of the clock signals and data transferred between the memory module and the memory controller is due to propagation delays and process-voltage temperature (PVT) variations.

13. The memory controller of claim 11, further comprising a write data buffer, coupled to the memory module, for transmitting data to the memory module in response to the input clock signal.

14. The memory controller of claim 13, wherein a propagation delay of data transmitted from the write data buffer to the memory module is substantially the same as the first propagation delay.

15. The memory controller of claim 11, further comprising an asynchronous first-in-first-out (ASYNC FIFO) buffer coupled to the memory module, wherein the ASYNC FIFO buffer reads data from the memory module in response to the feedback signal generated by feeding back the memory clock signal to the ASYNC FIFO buffer.

16. The memory controller of claim 15, wherein the ASYNC FIFO buffer provides data for sampling in response to the input clock signal.

17. In a synchronous data processing system, a method for transferring data between a memory module and a memory controller, comprising:
    receiving an input clock signal;
    transmitting an inverted input clock signal to the memory module to generate a memory clock signal for the memory module;
    feeding back the memory clock signal from the memory module to the memory controller such that the clock signals transferred between the memory controller and the memory module incur substantially the same phase delay as that of data transmitted between the memory module and the memory controller.

18. The method for transferring data of claim 17, further comprising:
    transmitting data from a write data buffer of the memory controller to the memory module in response to the input clock signal; and
    transmitting data from the memory module to an ASYNC FIFO buffer of the memory controller in response to a feedback signal generated by feeding back the memory clock signal to the ASYNC FIFO.

19. The method for transferring data of claim 18, further comprising:
    triggering sampling of data received from the memory module in response to the feedback signal; and
    providing data from the ASYNC FIFO buffer to a data sampling module in response to the input clock signal.

20. The method of transferring data of claim 18, wherein the clock signals and data transferred between the memory controller and the memory module incur substantially the same phase delay due to propagation delay and PVT variations.

* * * * *